United States Patent
Jung

(10) Patent No.: US 12,307,607 B2
(45) Date of Patent: May 20, 2025

(54) METHOD AND DEVICE FOR PROVIDING CONSTRUCTION MACHINERY MAINTENANCE MANUAL BY USING AUGMENTED REALITY

(71) Applicant: HD HYUNDAI INFRACORE CO., LTD., Incheon (KR)

(72) Inventor: Kwangho Jung, Incheon (KR)

(73) Assignee: HD HYUNDAI INFRACORE CO., LTD., Incheon (KR)

( * ) Notice: Subject to any disclaimer, the term of this patent is extended or adjusted under 35 U.S.C. 154(b) by 379 days.

(21) Appl. No.: 17/910,222

(22) PCT Filed: Mar. 9, 2021

(86) PCT No.: PCT/KR2021/002926
§ 371 (c)(1),
(2) Date: Sep. 8, 2022

(87) PCT Pub. No.: WO2021/182856
PCT Pub. Date: Sep. 16, 2021

(65) Prior Publication Data
US 2023/0104230 A1    Apr. 6, 2023

(30) Foreign Application Priority Data

Mar. 9, 2020 (KR) .................. 10-2020-0029016
Mar. 9, 2020 (KR) .................. 10-2020-0029150

(51) Int. Cl.
*G06T 19/00* (2011.01)
*G06F 9/451* (2018.01)
(Continued)

(52) U.S. Cl.
CPC ............ *G06T 19/006* (2013.01); *G06F 9/453* (2018.02); *G06T 13/20* (2013.01); *G06T 19/20* (2013.01);
(Continued)

(58) Field of Classification Search
CPC ....... G06T 19/006; G06T 13/20; G06T 19/20; G06T 2200/24; G06T 2210/62;
(Continued)

(56) References Cited

U.S. PATENT DOCUMENTS

2014/0210856 A1  7/2014  Finn et al.
2014/0310595 A1  10/2014  Acharya et al.
(Continued)

FOREIGN PATENT DOCUMENTS

| KR | 10-2017-0111038 A | 10/2017 |
| KR | 10-1949934 B1 | 2/2019 |
| KR | 10-2019-0105021 A | 9/2019 |

OTHER PUBLICATIONS

International Search Report issued Jun. 22, 2021, corresponding to International Application No. PCT/KR2021/002926, 4 pages.
(Continued)

*Primary Examiner* — Chong Wu
(74) *Attorney, Agent, or Firm* — Hauptman Ham, LLP

(57) ABSTRACT

In a method of providing a maintenance manual for a construction machine, an augmented reality content selection menu for providing a maintenance manual for the construction machine is provided. A user's content selection signal is received. A virtual 3D model corresponding to the construction machine is augmented on a display portion in response to the content selection signal. Augmented reality maintenance manual information is displayed at a corresponding position of the 3D model according to the content selection signal.

15 Claims, 19 Drawing Sheets

(51) Int. Cl.
*G06T 13/20* (2011.01)
*G06T 19/20* (2011.01)

(52) U.S. Cl.
CPC ...... *G06T 2200/24* (2013.01); *G06T 2210/62* (2013.01); *G06T 2219/2004* (2013.01)

(58) Field of Classification Search
CPC . G06T 2219/2004; G06T 19/00; G06F 9/453; G06F 1/1626; G06F 1/1694; G06F 2200/1637; G06F 2203/04808; G06F 3/04815; G06F 3/011; G06F 3/04883; G06F 9/451; G06Q 10/20; G06Q 30/016; G06Q 50/08
See application file for complete search history.

(56) References Cited

U.S. PATENT DOCUMENTS

| | | |
|---|---|---|
| 2016/0328883 A1 | 11/2016 | Parfenov et al. |
| 2018/0211447 A1 | 7/2018 | Spayd |
| 2019/0122435 A1 | 4/2019 | Prideaux-Ghee et al. |
| 2019/0228263 A1* | 7/2019 | Szeto .................. G02B 27/017 |

OTHER PUBLICATIONS

Extended European Search Report dated Feb. 22, 2024 in connection with the corresponding European Patent Application No. 21768267. 3, 9 pages.

* cited by examiner

FIG. 5

METHOD AND DEVICE FOR PROVIDING CONSTRUCTION MACHINERY MAINTENANCE MANUAL BY USING AUGMENTED REALITY

CROSS-REFERENCE TO RELATED APPLICATION

The present application is a national stage filing under 35 U.S.C § 371 of PCT application number PCT/KR2021/002926 filed on Mar. 9, 2021, which is based upon and claims the benefit of priorities to Korean Patent Application No. 10-2020-0029016 filed on Mar. 9, 2020 and Korean Patent Application No. 10-2020-0029150 filed on Mar. 9, 2020, in the Korean Intellectual Property Office, which are incorporated herein in their entireties by reference.

TECHNICAL FIELD

The present invention relates to a method and a device for providing a maintenance manual of a construction machine. More particularly, the present invention relates to a method and a device for providing a maintenance manual of a construction machine using augmented reality.

BACKGROUND ART

There are many difficulties and inconveniences in checking various information at the site during performance test and maintenance of construction equipment. In addition, since it is difficult for non-experts to directly carry out measures, a lot of measures are taken through an on-site dispatch of experts, which takes a lot of time and money, and there are problems in that the non-operation time of the equipment increases and the economic loss of the customer increases.

DISCLOSURE OF THE INVENTION

Problems to be Solved

An object of the present invention provides a method of providing information on performance test and maintenance of a construction machine using augmented reality.

Anther object of the present invention provides a portable device for performing the method.

Means to Solve the Problems

According to example embodiments, in a method of providing a maintenance manual for a construction machine, an augmented reality content selection menu for providing a maintenance manual for the construction machine is provided. A user's content selection signal is received. A virtual 3D model corresponding to the construction machine is augmented on a display portion in response to the content selection signal. Augmented reality maintenance manual information is displayed at a corresponding position of the 3D model according to the content selection signal.

In example embodiments, receiving the user's content selection signal may include receiving a performance test guide request signal or a maintenance guide request signal, and receiving a detailed item request signal.

In example embodiments, augmenting the 3D model on the display portion may include displaying an image collected through a camera portion as an image on the display portion, providing the 3D model on the image, and placing the 3D model at a position selected by the user.

In example embodiments, providing the 3D model may include superimposing an image of the ground close to the user or the construction machine collected through the camera portion and the 3D model.

In example embodiments, providing the 3D model may include providing an outline corresponding to an actual construction machine on the display portion, and augmenting the 3D model on an image of the actual construction machine when the image of the actual construction machine collected through the camera portion is matched with the outline.

In example embodiments, displaying the augmented reality maintenance manual information at the corresponding position of the 3D model may include displaying a detailed part of the 3D model to be diagnosed according to the content selection signal, and displaying maintenance manual information related to the detailed part of the 3D model.

In example embodiments, the maintenance manual information related to the detailed part of the 3D model may include animation information in which the 3D model moves.

In example embodiments, displaying the detailed part of the 3D model may include moving to an internal position of the 3D model in response to the user's input signal to provide a shape of the detailed part at the internal position.

In example embodiments, displaying the detailed part of the 3D model may include displaying an external shape of the 3D model to have a first transparency, and displaying the detailed part to have a second transparency lower than the first transparency.

In example embodiments, the augmented reality maintenance manual information may include guide information for performing a performance test or maintenance of the construction machine.

According to example embodiments, a portable device includes a camera portion configured to collect images, a display portion configured to display the images collected through the camera portion, and a controller configured to augment a virtual 3D model corresponding to a construction machine on the display portion in response to an augmented reality content selection signal for providing a maintenance manual for the construction machine and configured to display augmented reality maintenance manual information at a corresponding position of the 3D model according to the augmented reality content selection signal.

In example embodiments, the controller may display the image collected through the camera portion as an image on the display portion, provide the 3D model on the image, and place the 3D model at a position selected by a user.

In example embodiments, the controller may superimpose an image of the ground close to the user or the construction machine collected through the camera portion and the 3D model.

In example embodiments, the controller may provide an outline corresponding to an actual construction machine on the display portion, and augment the 3D model on an image of the actual construction machine when the image of the actual construction machine collected through the camera portion is matched with the outline.

In example embodiments, the controller may display a detailed part of the 3D model to be diagnosed according to the content selection signal, and display maintenance manual information related to the detailed part of the 3D model.

In example embodiments, the maintenance manual information related to the detailed part of the 3D model may include animation information in which the 3D model moves.

In example embodiments, the controller may move to an internal position of the 3D model in response to a user's input signal to provide a shape of the detailed part at the internal position.

In example embodiments, the controller may provide an external shape of the 3D model to have a first transparency and provide the detailed part to have a second transparency lower than the first transparency.

In example embodiments, the augmented reality maintenance manual information may include guide information for performing a performance test or maintenance of the construction machine.

Effects of the Invention

According to example embodiments, information on detailed performance items and methods for performance testing and maintenance may be provided easily and quickly and intuitively by utilizing augmented reality technology. Thus, it may be possible to improve the operator's diagnostic capability and self-maintenance capability, and to increase the operating time of equipment and reduce maintenance costs through rapid maintenance.

However, the effect of the invention may not be limited thereto, and may be expanded without being deviated from the concept and the scope of the present invention.

BRIEF DESCRIPTION OF THE DRAWINGS

FIGS. 5 to 11 are views illustrating an example of the step of providing augmented reality content for the performance test guide in FIG. 3.

BEST MODE FOR CARRYING OUT THE INVENTION

Figure 1:
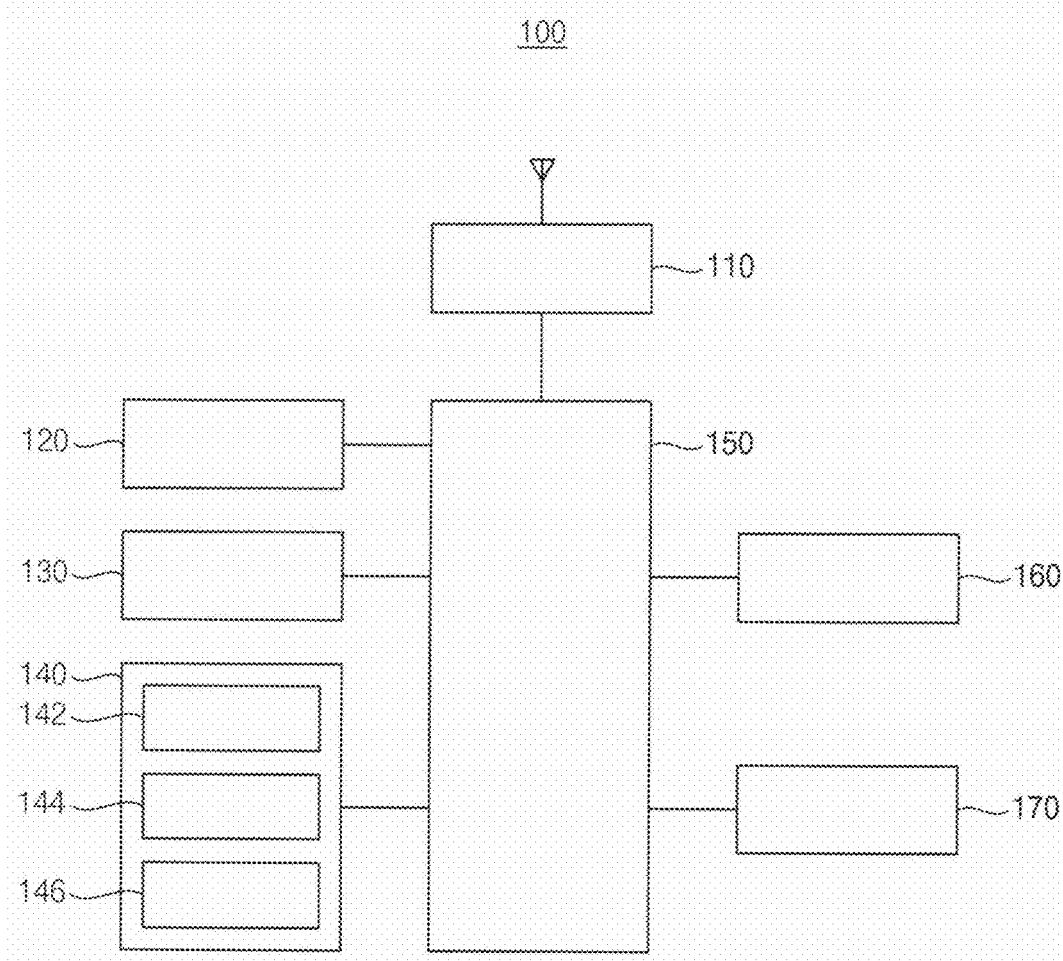
FIG. 1 is a block diagram illustrating a portable device in accordance with example embodiments.

Hereinafter, preferable embodiments of the present invention will be explained in detail with reference to the accompanying drawings.

In the drawings, the sizes and relative sizes of components or elements may be exaggerated for clarity.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

The terminology used herein is for the purpose of describing particular example embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Example embodiments may, however, be embodied in many different forms and should not be construed as limited to example embodiments set forth herein. Rather, these example embodiments are provided so that this disclosure will be thorough and complete, and will fully convey the scope of example embodiments to those skilled in the art.

FIG. 1 is a block diagram illustrating a portable device in accordance with example embodiments.

Referring to FIG. 1, a portable device 100 may include a communication portion 110, an input portion 120, a camera portion 130, a sensor portion 140, a controller 150, a storage portion 160 and a display portion 170.

In example embodiments, the portable device 100 may be a terminal for providing augmented reality contents. The portable device 100 may include a smart phone, a tablet, a wearable device such as a glass-type terminal or a watch-type terminal, etc. used by a user. Here, the user may mean a person who inputs a signal to the portable device and uses an augmented reality application program.

The communication portion 110 may perform data communication with external device. The communication portion 110 may include a transmitter for up-converting and amplifying a frequency of a transmitted signal, and a receiver for down-converting and amplifying a frequency of a received signal.

The communication portion 110 may communicate with a server that provides 3D model information as a three-dimensional computer graphic image of a construction machine to be diagnosed and augmented reality maintenance manual information for a diagnosis guide of the construction machine. The communication portion 110 may transmit a 3D model information request, an augmented reality maintenance manual information request, and the like to the server. In addition, the communication portion 110 may receive the 3D model information, the augmented reality maintenance manual information, and the like from the server.

The input portion 120 may detect a user's input and transmit an input signal corresponding to the user's input to the controller 130. The input portion 120 may include a button, a jog dial, a wheel, and the like, and may sense an input of a user's human body or a pen using a touch sensor, an electromagnetic sensor, a proximity sensor, an IR sensor, and the like.

The input portion 120 may be configured as an input pad. The input portion 120 may be configured in a form in which various sensors are mounted on an input pad. The input portion 120 may be configured as an input pad in which a touch sensor is attached to the input pad in the form of a film or combined in the form of a panel. The input portion 120 may be configured as an EMR (Electro Magnetic Resonance) or EMI (Electro Magnetic Interference) type input pad using an electromagnetic sensor. The input portion 120 may include one or more input pads forming a mutually layered structure in order to sense an input using a plurality of sensors.

The input portion 120 may form a layer structure with the display portion 170 to operate as an input screen. For example, the input portion 120 may include an input pad having a touch sensor and may be configured as a touch screen panel (TSP) coupled with the display portion 170.

For example, the input portion 120 may detect a request for arrangement and movement of the 3D model, a request for display and selection of augmented reality content, and the like.

The camera portion 130 may collect an image including at least one subject, convert it into a data signal, and transmit the data signal to the controller 150. The controller 150 may control the display portion 170 to recognize a specific subject from the image or display the collected image as a preview screen based on the data signal received from the camera portion 130. In addition, when a request to perform a photographing is detected, the controller 150 may generate an image from an image collected through the camera portion 130 at the time when the request to perform a photographing is detected. The controller 150 may temporarily or permanently store the generated image in the storage portion 160.

The sensor portion 140 may include a plurality of sensors for detecting a current state of the portable device 100. The sensor portion 140 may generate a detection signal corresponding to the sensed state and transmit the detection signal to the controller 150.

For example, the sensor portion 140 may include a GPS sensor 142, a gravity sensor 144 and a gyro sensor 146, etc., to collect geographic/location information of the portable device 100.

The GPS sensor 142 may generate current location information of the portable device 100 based on a GPS signal received from a GPS satellite through the communication portion 110. The GPS sensor 142 may determine latitude, longitude and altitude of the portable device 100 using a GPS signal received from a plurality of GPS satellites using triangulation method or the like.

The gravity sensor 144 may detect a direction in which gravity acts. The gravity sensor 144 may detect a tilt of the portable device 100 by detecting gravity acting on the portable device 100, that is, a direction of acceleration, or may determine an orientation of the portable device 100 by detecting geomagnetism around the device 100. Since the gravity sensor 144 determines the orientation using geomagnetism, the gravity sensor 144 may be configured as a geomagnetic sensor or may operate similarly to a geomagnetic sensor.

The gyro sensor 146 may be a sensor that measures a rotation angle of the portable device 100, and may detect the rotation angle with respect to a 3D reference axis. For example, the gyro sensor 146 may detect rotation angles with respect to x, y and z axes with the center of the portable device 100 as the origin, that is, pitch, roll, and yaw.

The controller 150 may control the communication portion 110 to transmit the information obtained through the sensor portion 140 to the server, and the server may provide augmented reality maintenance manual information based on the information. In addition, the controller 150 may control the display portion 170 to move the 3D model on the display portion 170 according to motion detection information according to the movement of the portable device 100 acquired through the sensor portion 140, so that it may be possible to allow the user to view various positions inside and outside the 3D model.

The controller 150 may control each component for the overall operation of the portable device 100. For example, the controller 150 may control each component of the portable device 100 to provide augmented reality content for a diagnosis guide.

For example, the controller 150 may control the display portion 170 to display the augmented reality content in response to a display request of the augmented reality content.

A more specific operation of the controller 150 will be described in detail below with reference to the drawings.

The storage portion 160 may store programs or commands for the portable device 100. The controller 150 may execute programs or commands stored in the storage portion 160.

The storage portion 160 may include at least one type of storage medium among a flash memory type (flash memory type), a hard disk type (hard disk type), a multimedia card micro type (multimedia card micro type) or a card type memory (for example, SD or XD memory etc.), Random Access Memory (RAM), Static Random Access Memory (SRAM), Read-Only Memory (ROM), Electrically Erasable Programmable Read-Only Memory (EEPROM), Programmable Read-Only Memory (PROM), a magnetic memory, a magnetic disk and an optical disk.

For example, the storage portion 160 may store at least one augmented reality content.

The display portion 170 may display (output) information processed by the portable device 100. For example, the display portion 170 may display information corresponding to a currently running application, program, or service together with a user interface (UI).

The display portion 170 may include at least one of a liquid crystal display (LCD), a thin film transistor-liquid crystal display (TFT LCD), an organic light-emitting diode (OLED), a flexible display and a three-dimensional display (3D display).

The display portion 170 may form a layer structure with the touch sensor and/or electromagnetic sensor constituting the input portion 120 to operate as a touch screen. In this case, the display portion 170 operating as the touch screen may perform a function of the input device.

The display portion 170 may display a list of augmented reality contents or augmented reality contents under the control of the controller 150.

Since the components shown in FIG. 1 are not essential, the portable device 100 having more of fewer components may be implemented.

Hereinafter, a method of providing a maintenance manual for a construction machine using augmented reality using the portable device of FIG. 1 will be described.

Figure 2:
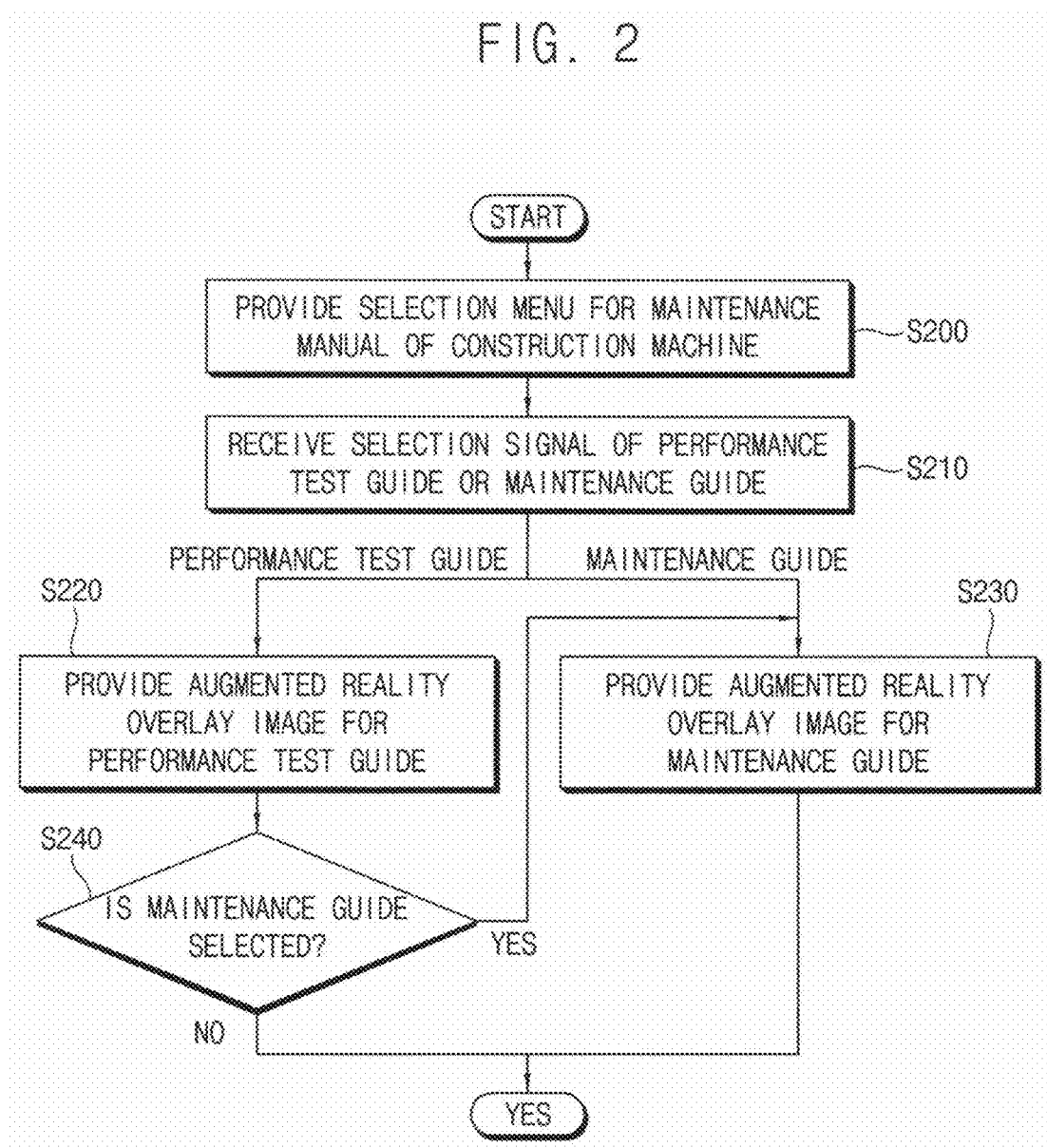
FIG. 2 is a flow chart illustrating a method of providing a maintenance manual for a construction machine using augmented reality according to exemplary embodiments.

FIG. 2 is a flow chart illustrating a method of providing a maintenance manual for a construction machine using augmented reality according to exemplary embodiments.

Figure 3:
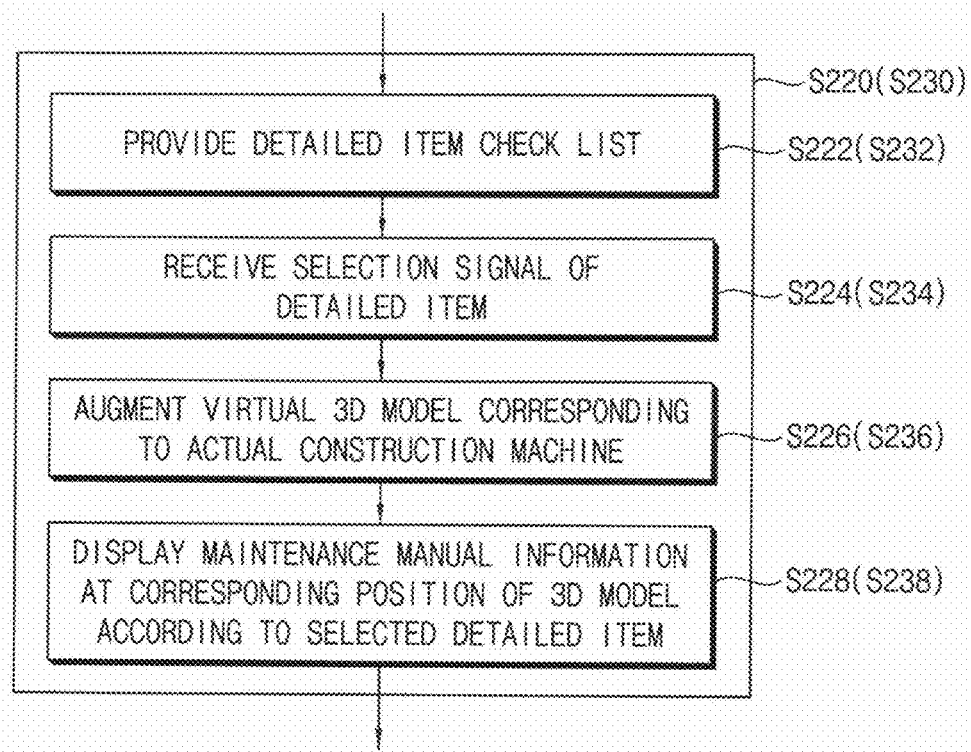
FIG. 3 is a flow chart illustrating an augmented reality content providing step for a performance test guide (or augmented reality content providing step for a maintenance guide) in the maintenance manual providing method in FIG. 2.
Figure 4:
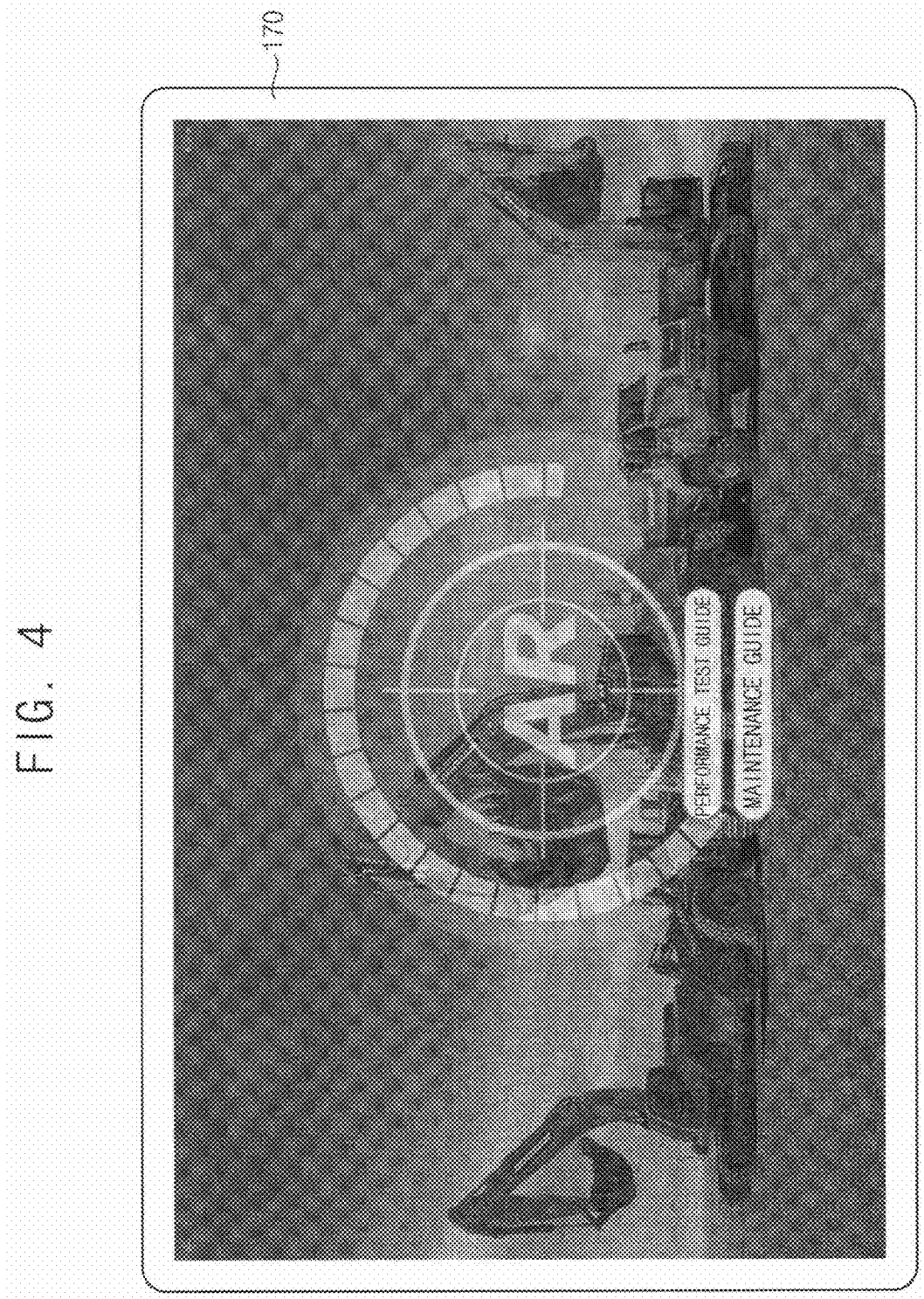
FIG. 4 is a view illustrating a start screen of an application for performing the method of providing a maintenance manual for a construction machine in FIG. 2.

FIG. 3 is a flow chart illustrating an augmented reality content providing step for a performance test guide (or augmented reality content providing step for a maintenance guide) in the maintenance manual providing method in FIG. 2. FIG. 4 is a view illustrating a start screen of an application for performing the method of providing a maintenance manual for a construction machine in FIG. 2.

Referring to FIGS. 2 and 3, when an augmented reality application is executed, an augmented reality content selection menu for a diagnostic guide of a construction machine may be provided (S200), and a user's content selection signal may be received (S210).

As shown in FIG. 4, in example embodiments, when the augmented reality application is started, the controller 150 may provide a selection menu on the display portion 170 of the portable device 100. A selection button for selecting a performance test guide or a maintenance guide of a construction machine may be provided in the selection menu.

Then, the controller 150 may determine whether the augmented reality content request is detected. The controller 150 may receive a performance test guide request signal or a maintenance guide request signal inputted through the input portion 120.

Then, an augmented reality overlay image including augmented reality content may be provided according to the performance test guide request signal or the maintenance guide request signal (S220, S230).

First, the controller 150 may provide a detailed item check list on the display portion 170 of the portable device 100 (S222 or S232), may receive a user's selection signal of the detailed item (S224 or S232), and may augment a virtual 3D model corresponding to the construction machine on the display portion 170 in response to the selection signal (S226 or S236), and may display augmented reality maintenance manual information at a corresponding position of the 3D model according to the selection signal (S228 or S238).

The augmented reality overlay image may include an image of the 3D virtual model augmented on the display portion 170 and maintenance manual information superimposed on the 3D model. The image of the maintenance manual information may be displayed at a corresponding position of the 3D model by a template. The template may include information on a location to associate a context representing the content of the information to the 3D model.

In example embodiments, after providing the augmented reality content information for the performance test guide, when the user requests the maintenance guide, the controller 150 may provide augmented reality content information for the maintenance guide.

Hereinafter, an example of the step of providing the augmented reality content for the performance test guide will be described.

FIGS. 5 to 11 are views illustrating an example of the step of providing augmented reality content for the performance test guide in FIG. 3.

Figure 5:
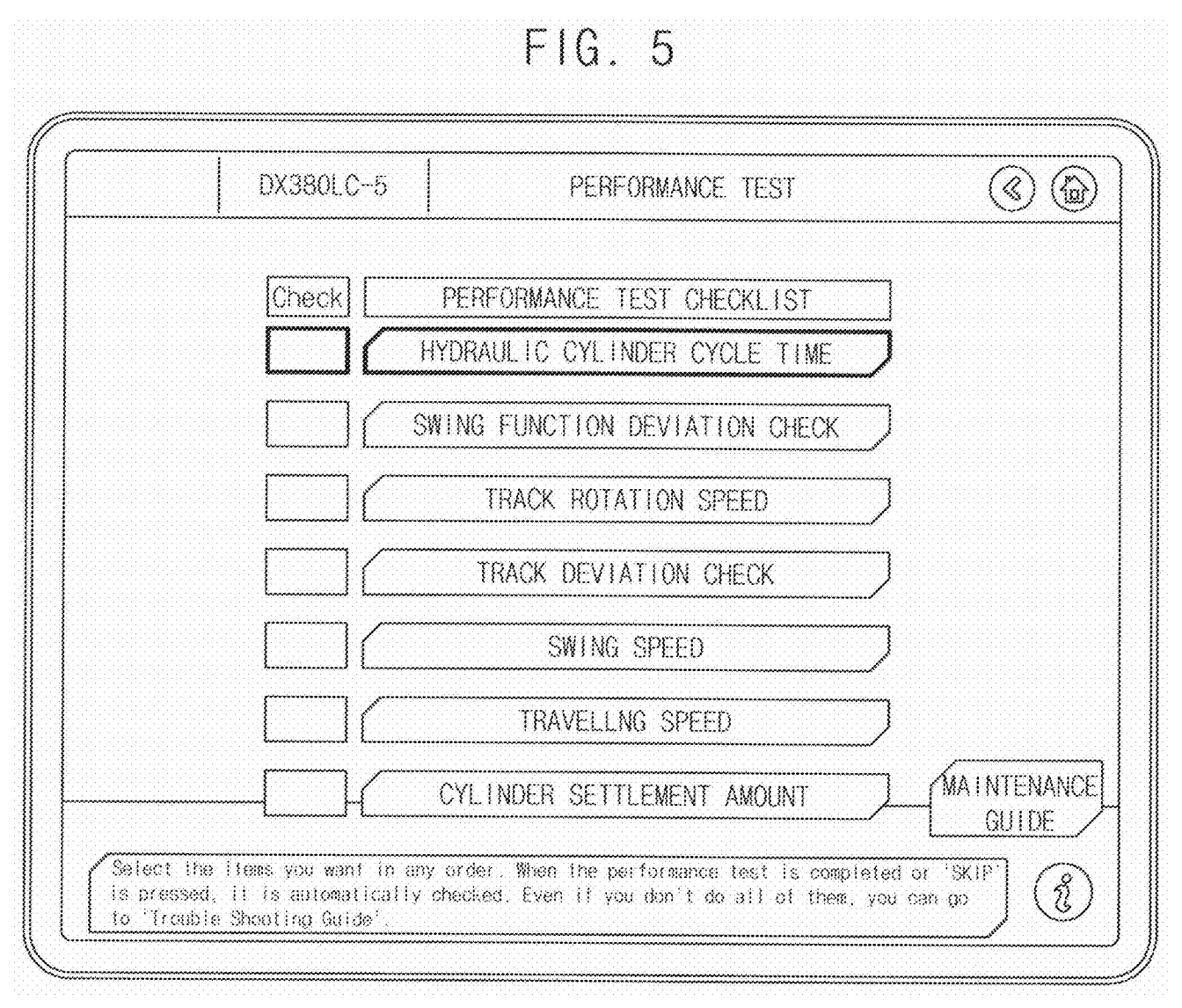

Referring to FIG. 5, when the performance test guide is selected, a performance test checklist may be provided. For example, in the performance test checklist, selection buttons for selecting hydraulic cylinder cycle time, swing function deviation check, track rotation speed, track deviation check, swing speed, traveling speed or cylinder settlement amount measurement item may be provided.

When the hydraulic cylinder cycle time item is selected, a virtual 3D model corresponding to the construction machine may be augmented on the display portion 170.

Figure 6:
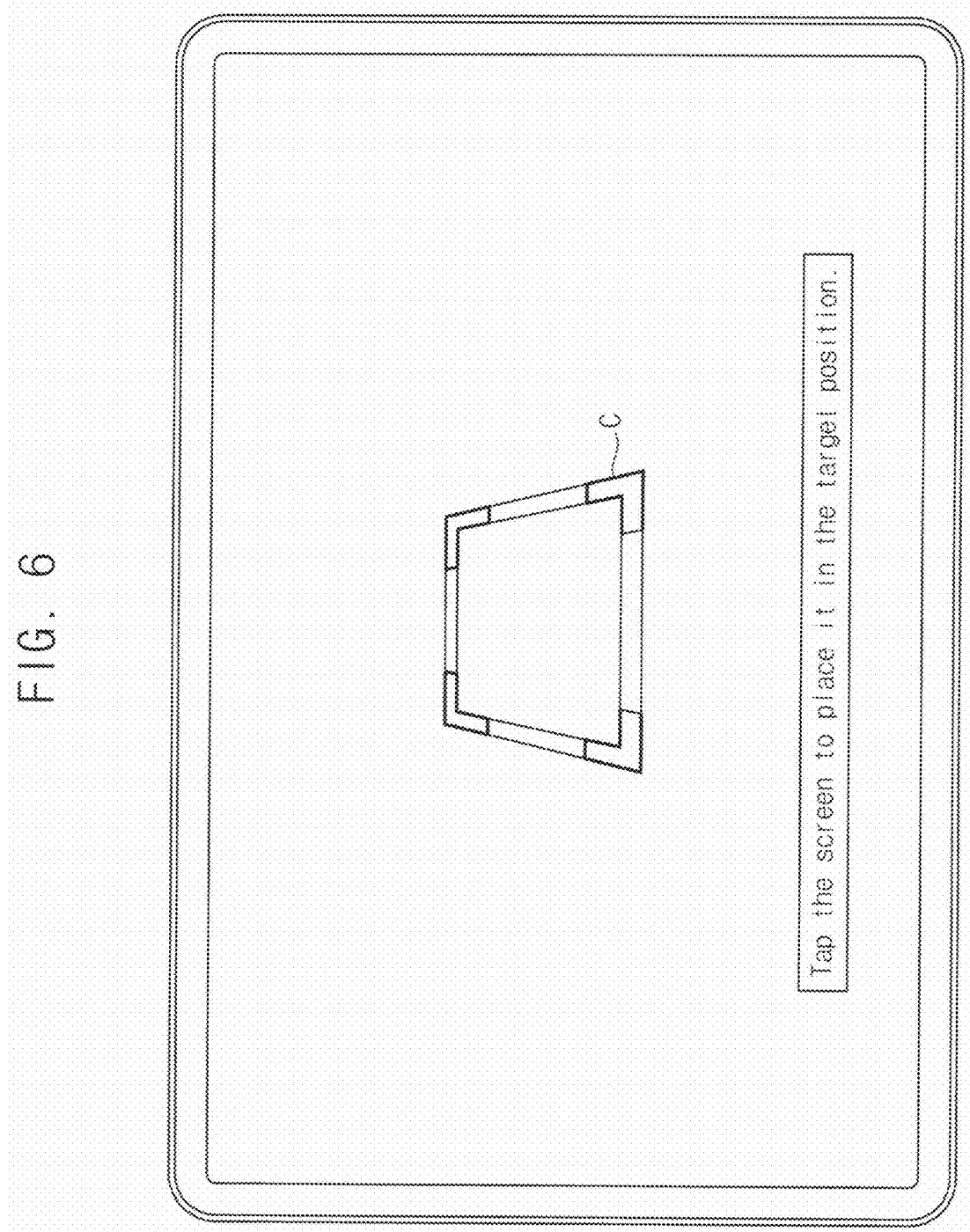
Figure 7:
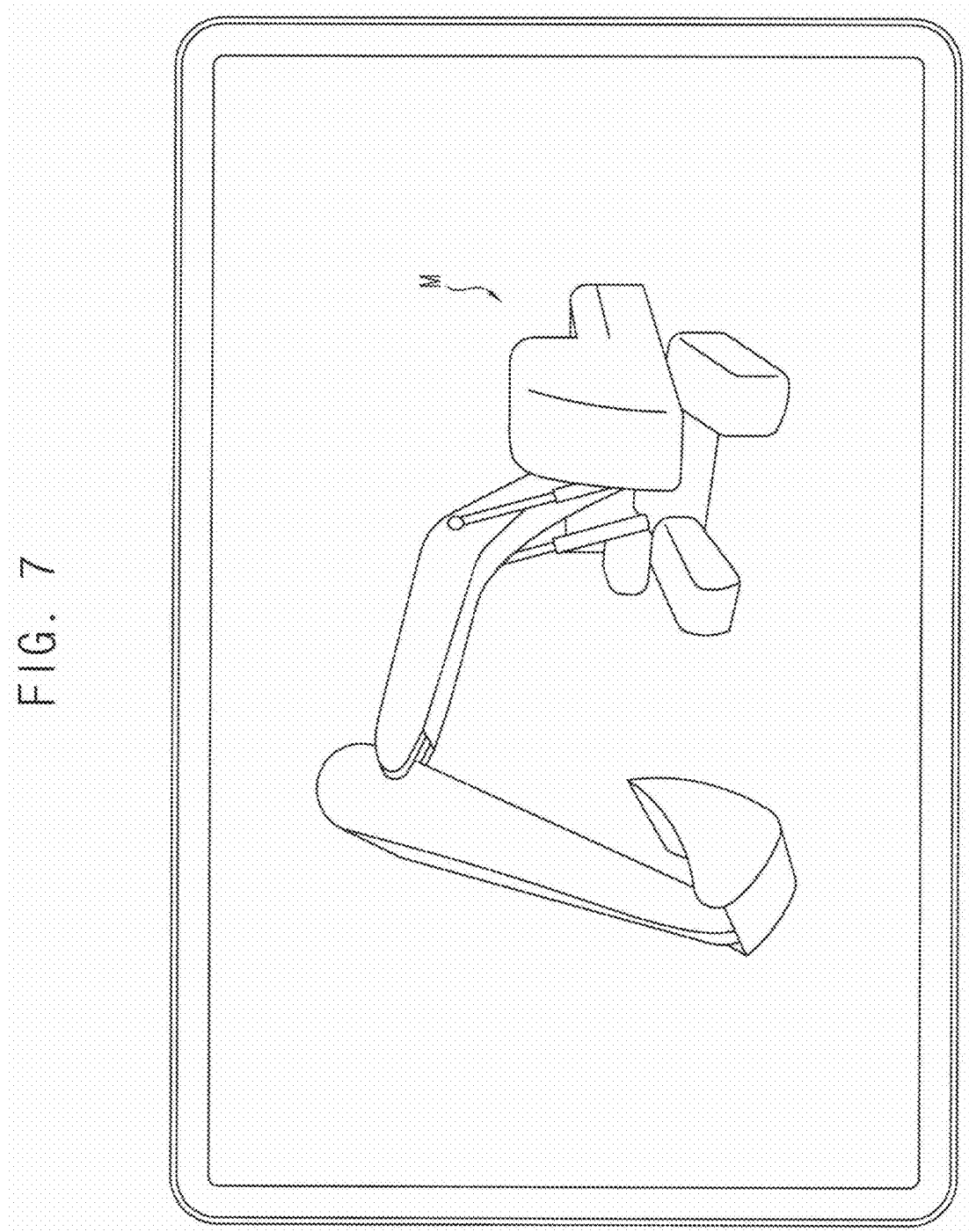

First, as illustrated in FIGS. 6 and 7, the controller 150 may display the image collected through the camera portion 130 as an image on the display portion 170, and a 3D model M corresponding to the construction machine model (DX380LC-5) may be provided on the image.

When the camera portion 130 is moved to photograph the ground close to the user, the 3D model M may be provided on a target C displayed on the display portion 170, and when the user taps the screen, it may be placed in the target position, and the 3D model M may be displayed based on x, y, and z coordinates stored on the screen.

The 3D model M of FIG. 7 may be moved by a user's input signal. For example, the 3D model M may be zoomed in or out by making the distance between two fingers touched on the screen closer or farther away. By sliding two fingers, the 3D model M may be rotated, and by sliding one finger in one direction, the 3D model M may be moved in one direction. Additionally, by moving the portable device 100 (according to motion detection information according to the motion of the portable device 100), the 3D model M may be displayed in a different direction.

Figure 7A:
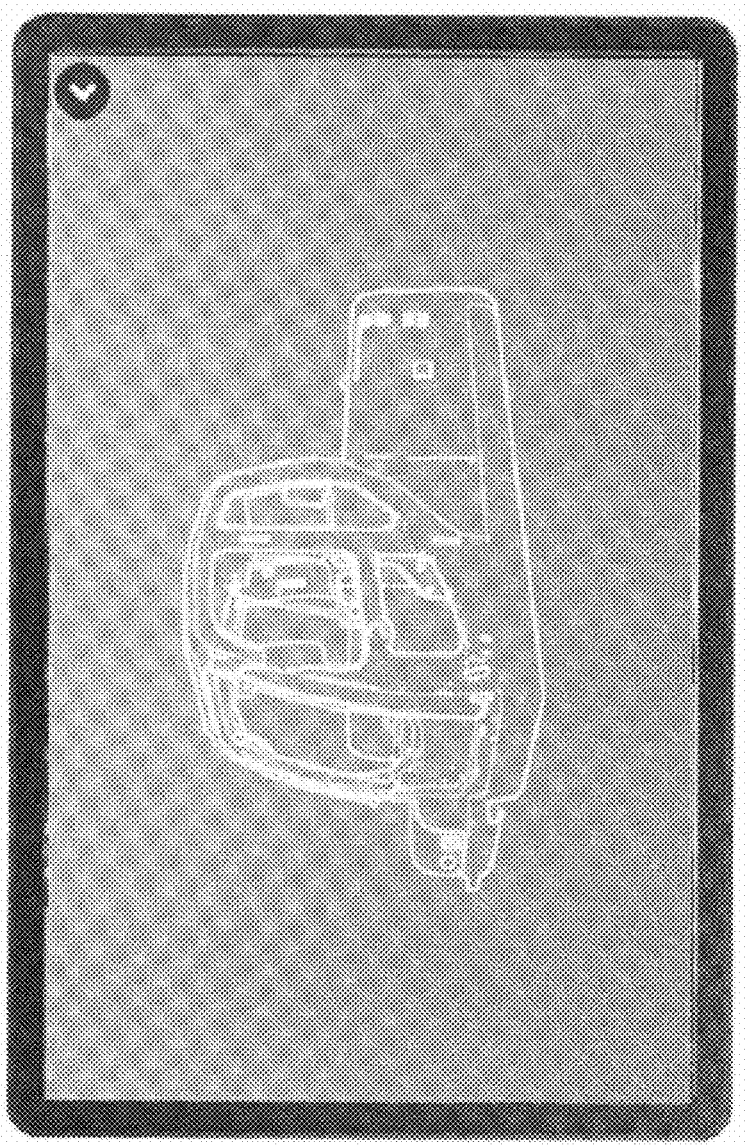

FIG. 7A is a view illustrating an example of an outline provided in correspondence with a construction machine model.

In example embodiments, the user may display an image of the actual construction machine collected through the camera portion 130 and a 3D model corresponding thereto to be superimposed on the display portion 170. The user may reduce, enlarge, rotate, or move the 3D model M directly on the display portion 170 to overlap the image of the actual construction machine. For example, as illustrated in FIG. 7A, the controller 150 may display the image collected through the camera portion 130 as an image on the display portion 170, and an outline provided in correspondence with the construction machine model (DX380LC-5) may be provided on the image.

When the user moves the portable device 100 to fit the actual equipment to the outline, the controller 150 may augment a 3D model on the image of the actual equipment. In this case, the entire shape of the 3D model superimposed on the actual equipment may be displayed in a perspective view having a first transparency, and a circuit diagram layout of detailed electrical parts may be displayed to have a second transparency lower than the first transparency. In example embodiments, a shape of the detailed part may be provided by moving to an internal position of the 3D model M in response to the user's input signal.

Figure 8:
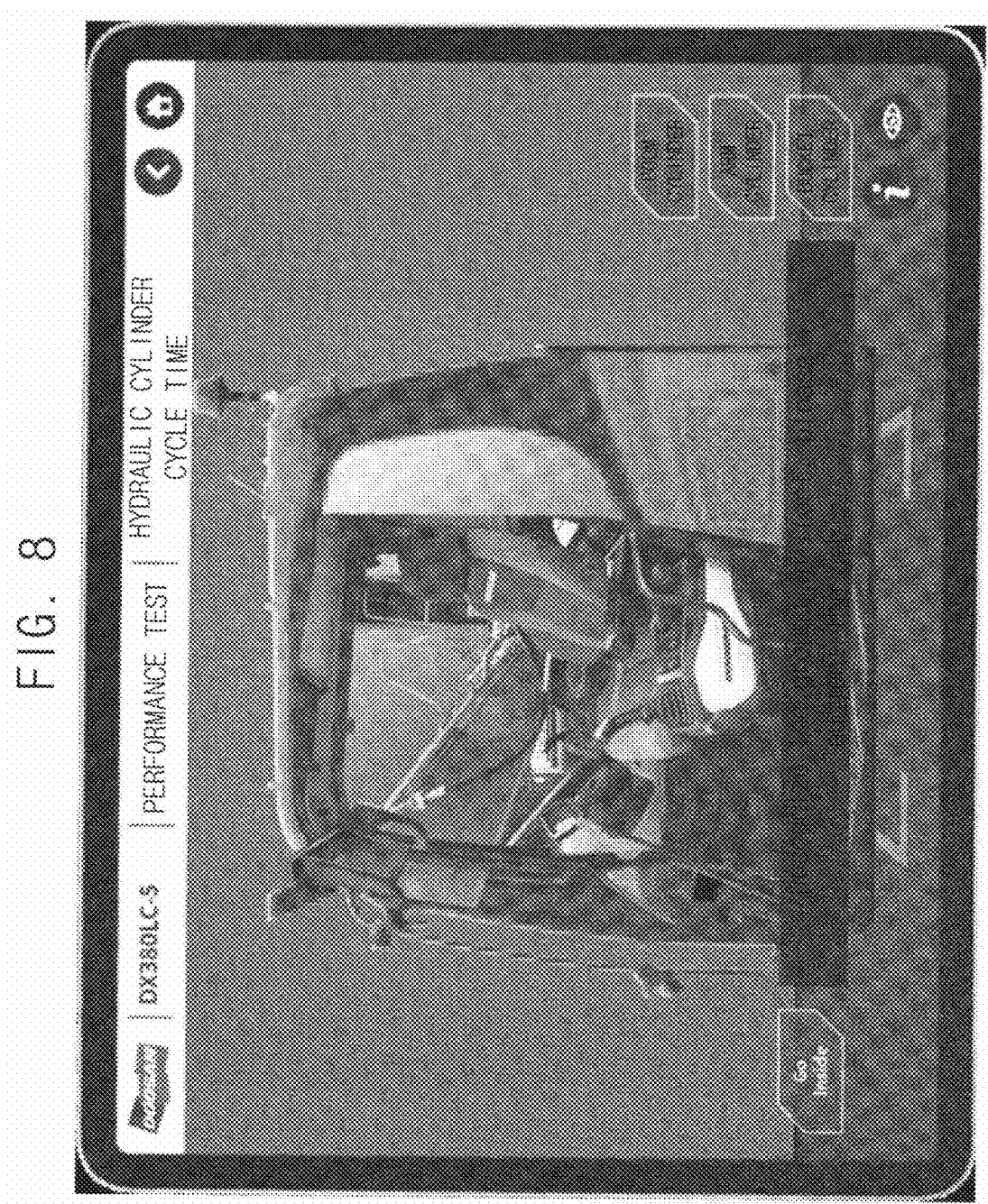
Figure 9:
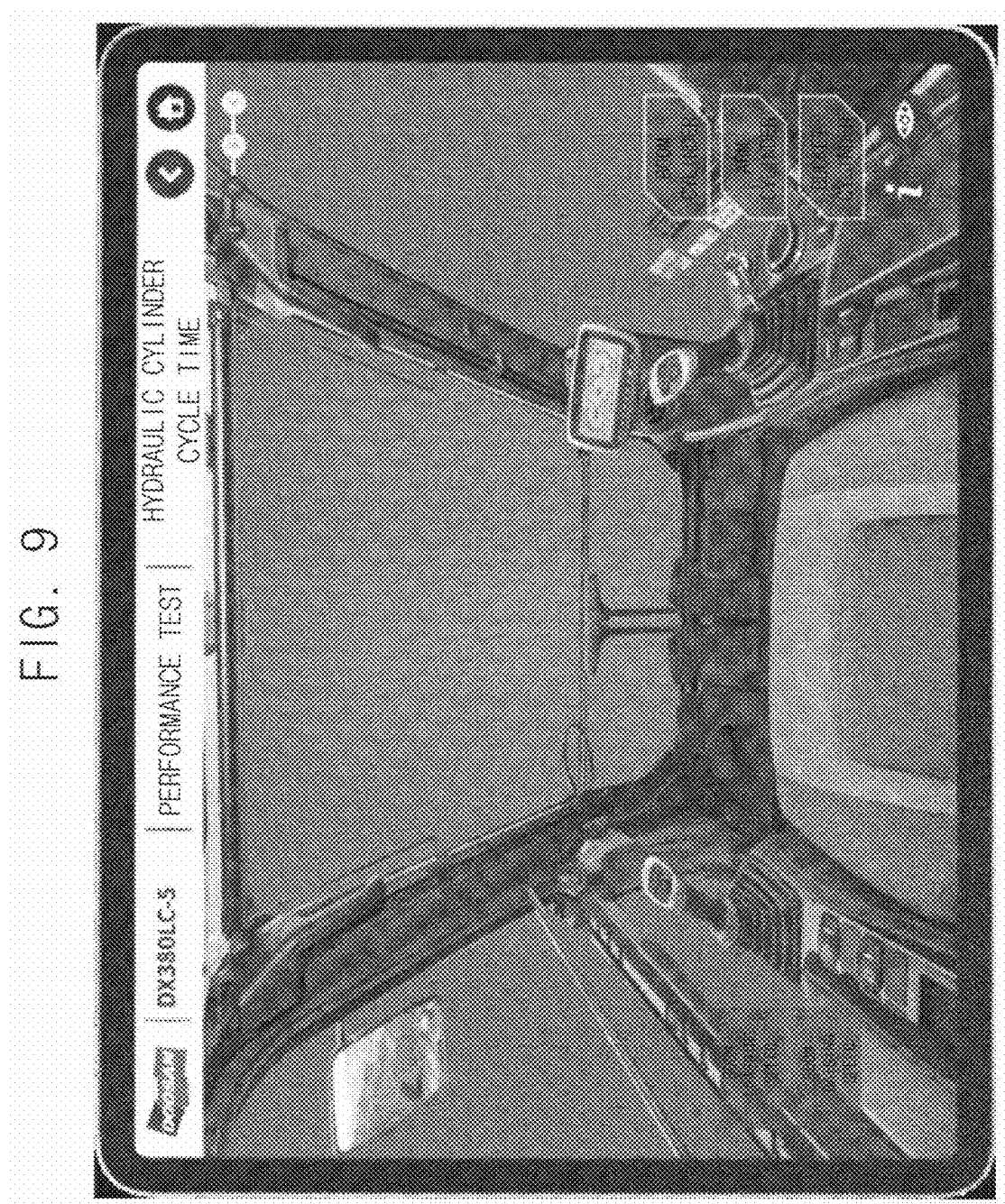

As illustrated in FIGS. 8 and 9, a virtual image of the inside of the cabin may be provided by inputting an inside movement selection button (Go Inside) provided on the screen or by the user's input signal.

Figure 10:
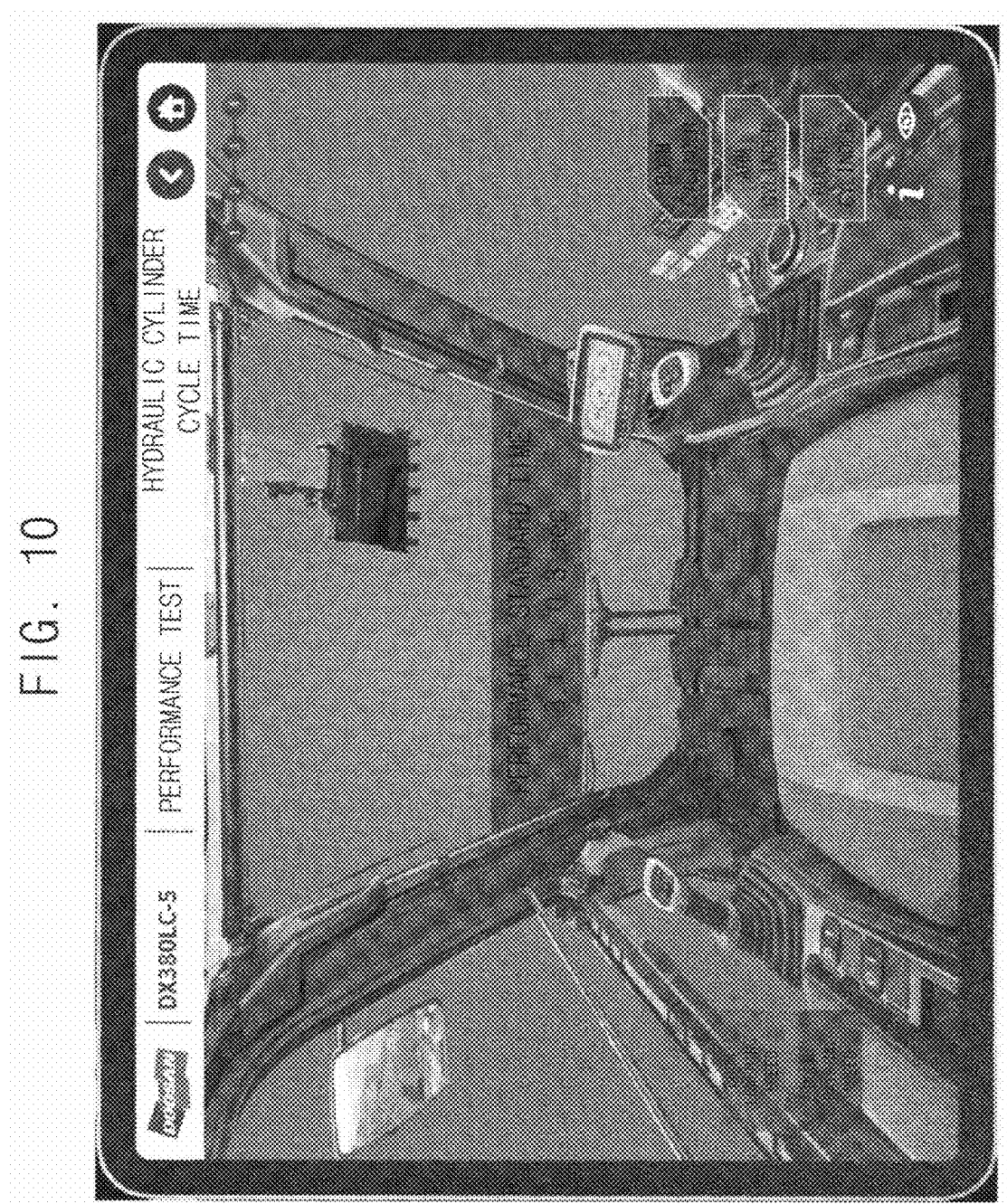

As illustrated in FIG. 10, when the user selects the boom lowering speed of the boom cylinder, an animation in which the boom cylinder descends from a viewpoint of the user boarding the actual equipment (cabin) may be produced, and the performance standard time may be displayed. Although not illustrated in the drawings, according to the user's selection, an animation in which the boom cylinder descends from a viewpoint that the user sees from the outside of the equipment may be produced, and the performance standard time may be displayed. This helps the user to easily perform the performance test regardless of the location, and both the performance test guide and the maintenance guide can select the user's viewpoint, and animations and guides related to detailed parts may be provided at the selected point of view. In addition, the user can superimpose and display the collected images of the actual construction machine and the corresponding 3D model on the display portion 170, and simultaneously perform augmented reality animation production and actual device testing, so that even non-experts can easily identify problematic parts.

Accordingly, the user may be provided with guide information for performance testing of detailed parts such as a boom cylinder. The user may be provided with information on the performance test method for an arm cylinder and a bucket cylinder. In addition, information on a joystick operation method for the performance test, test conditions (power mode, engine control dial, work mode, auto idle, etc.) may be provided.

Accordingly, by experiencing the content information for the performance test of the detailed parts of the construction machine in the form of a step-by-step scenario, it may be possible to provide an environment where non-experts can perform performance tests through augmented reality.

Figure 11:

As illustrated in FIG. 11, when the selected detailed item is finished, the performance test checklist may be provided, and the user may proceed to the next item. In addition, a selection button for selecting the maintenance guide may be provided, and the user may proceed directly to the step of providing the augmented reality content for the maintenance guide.

Hereinafter, an example of the step of providing the augmented reality content for the maintenance guide will be described.

FIGS. 12 to 18 are views illustrating an example of the step of providing augmented reality content for the maintenance guide in FIG. 3.

In example embodiments, when the maintenance guide is selected, a detailed maintenance checklist may be provided. As a result of the performance test using the performance test guide, when an issue related to an arm crowd operation occurs, a detailed maintenance item related to the arm crowd operation may be selected.

Figure 12:
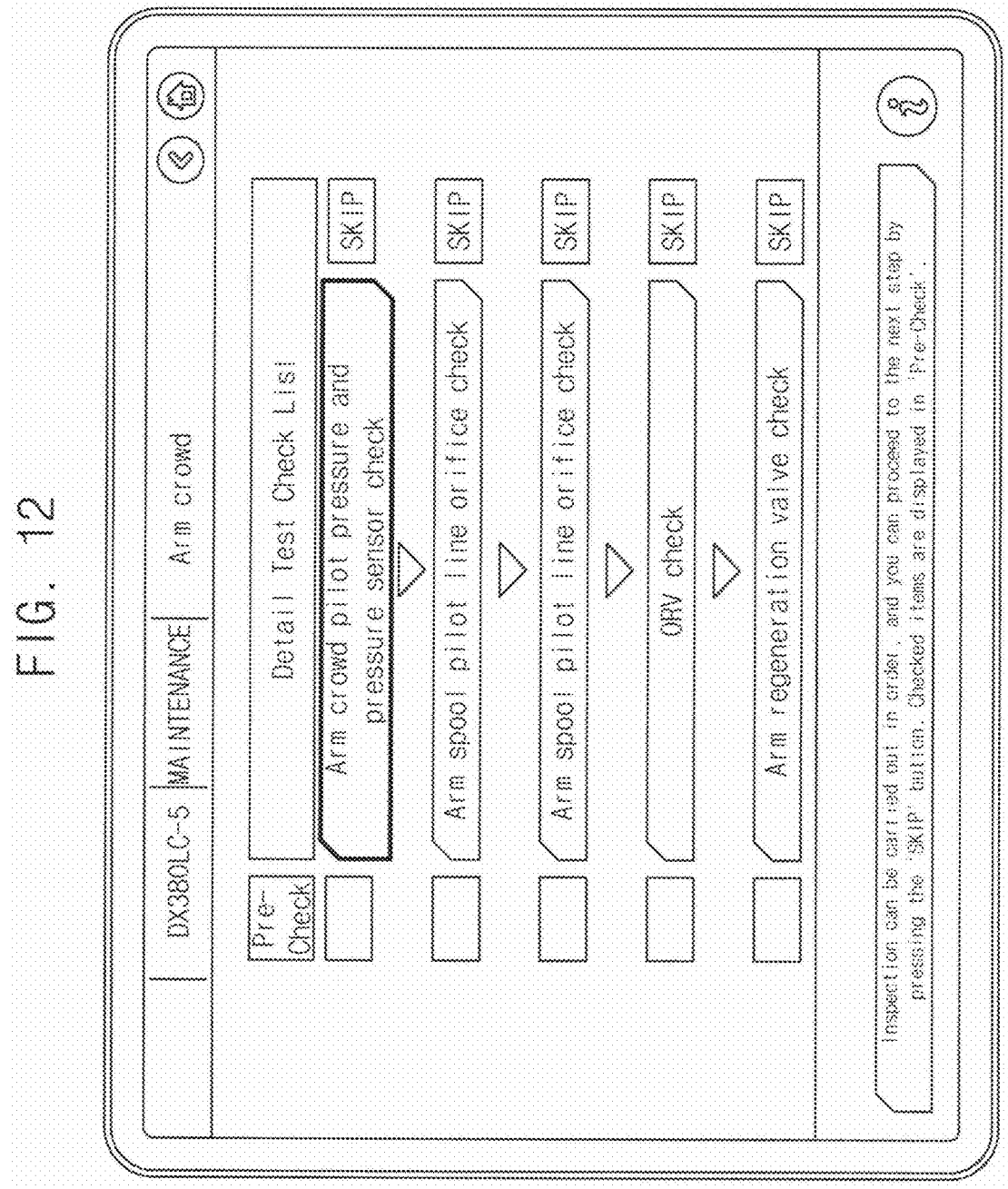
FIGS. 12 to 18 are views illustrating an example of the step of providing augmented reality content for the maintenance guide in FIG. 3.

As illustrated in FIG. 12, when a maintenance item related to the arm crowd is selected from among detailed items of the maintenance guide, a detailed test check list may be provided. For example, in the detailed test checklist, selection buttons for selecting items such as arm crowd pilot pressure and pressure sensor check, arm spool pilot line orifice check, arm holding valve check, ORV (Overload Relief Valve) check, or arm regeneration valve check may be provided.

Figure 13:
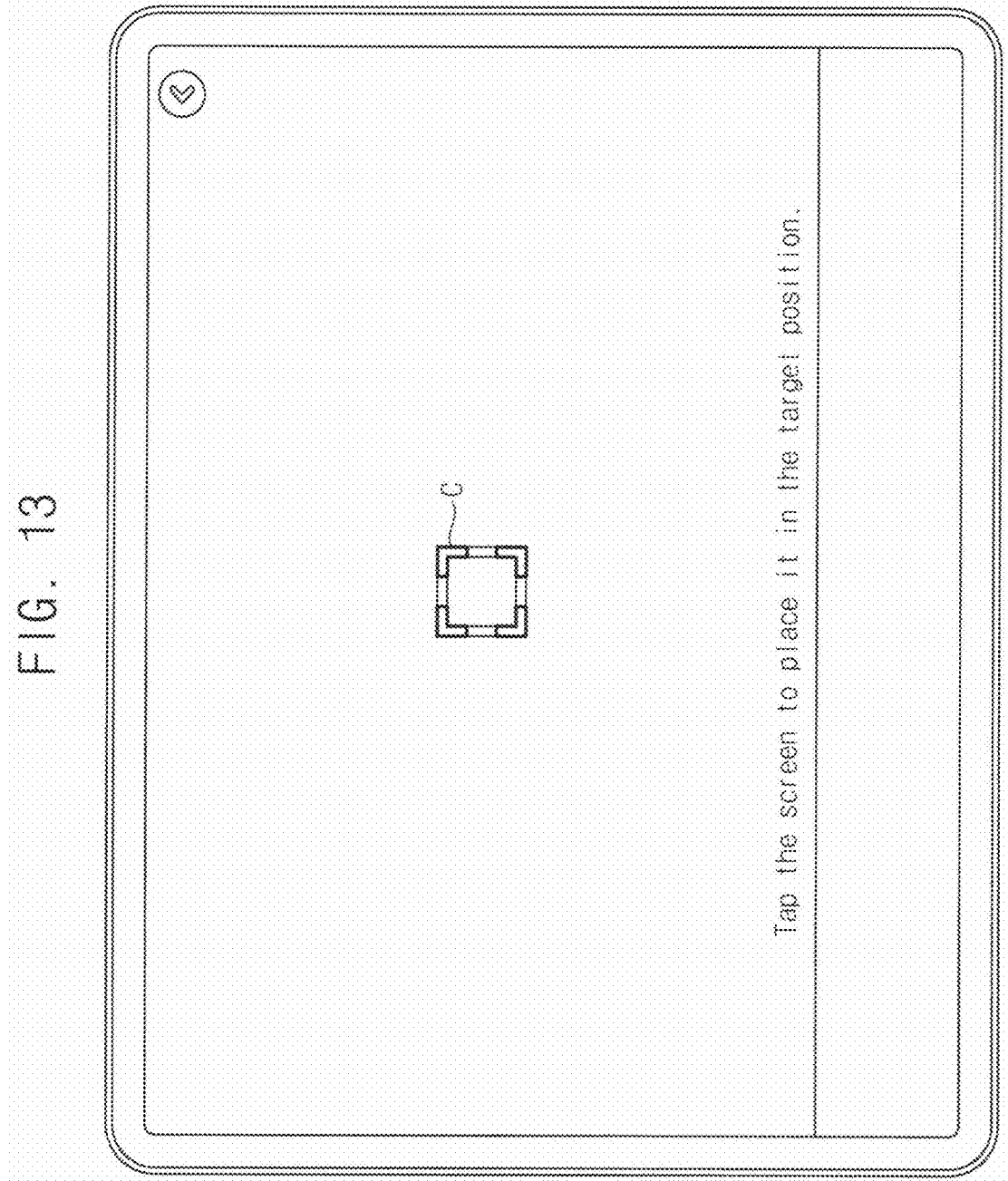
Figure 14:
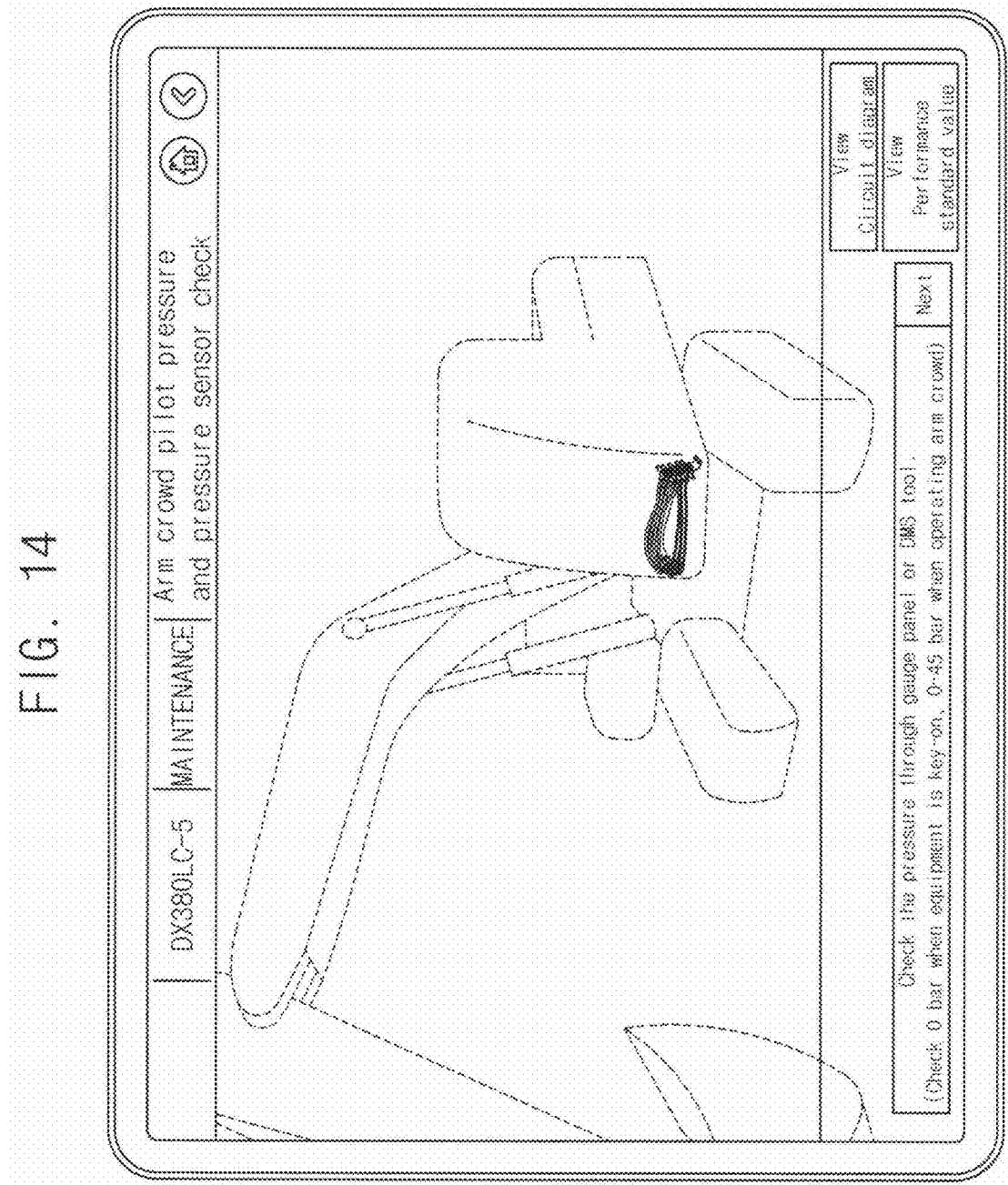

As illustrated in FIGS. 13 and 14, when the arm crowd pilot pressure and pressure sensor check item is selected, a virtual 3D model (M) corresponding to the construction machine model (DX380LC-5) may be augmented on the display portion 170. In this case, detailed parts corresponding to the arm crowd pilot pressure and pressure sensor may be displayed together. For example, the controller 150 may display the external shape of the 3D model M in a perspective view having a first transparency, and display the detailed parts to have a second transparency lower than the first transparency. Accordingly, the user can easily grasp the location of the detailed parts that are difficult to confirm outside the actual equipment, through the 3D model (M). When the user overlaps the image of the actual construction machine and the 3D model corresponding thereto on the display portion 170, the detailed parts can be more easily identified.

Figure 15:
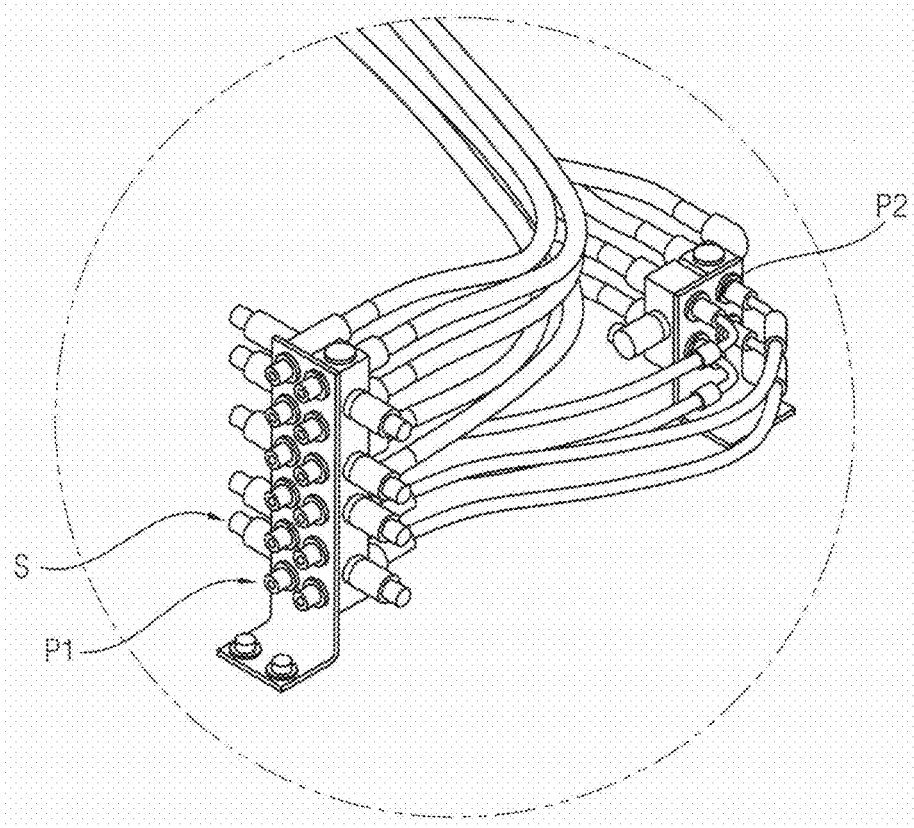

As illustrated in FIG. 15, the 3D model (M) may be enlarged by the user's input signal to provide an image of the internal detailed parts. P1 and P2 in FIG. 15 may represent arm crowd pilot pressures during arm crowd operation, and S may represent a pressure sensor.

Figure 16:
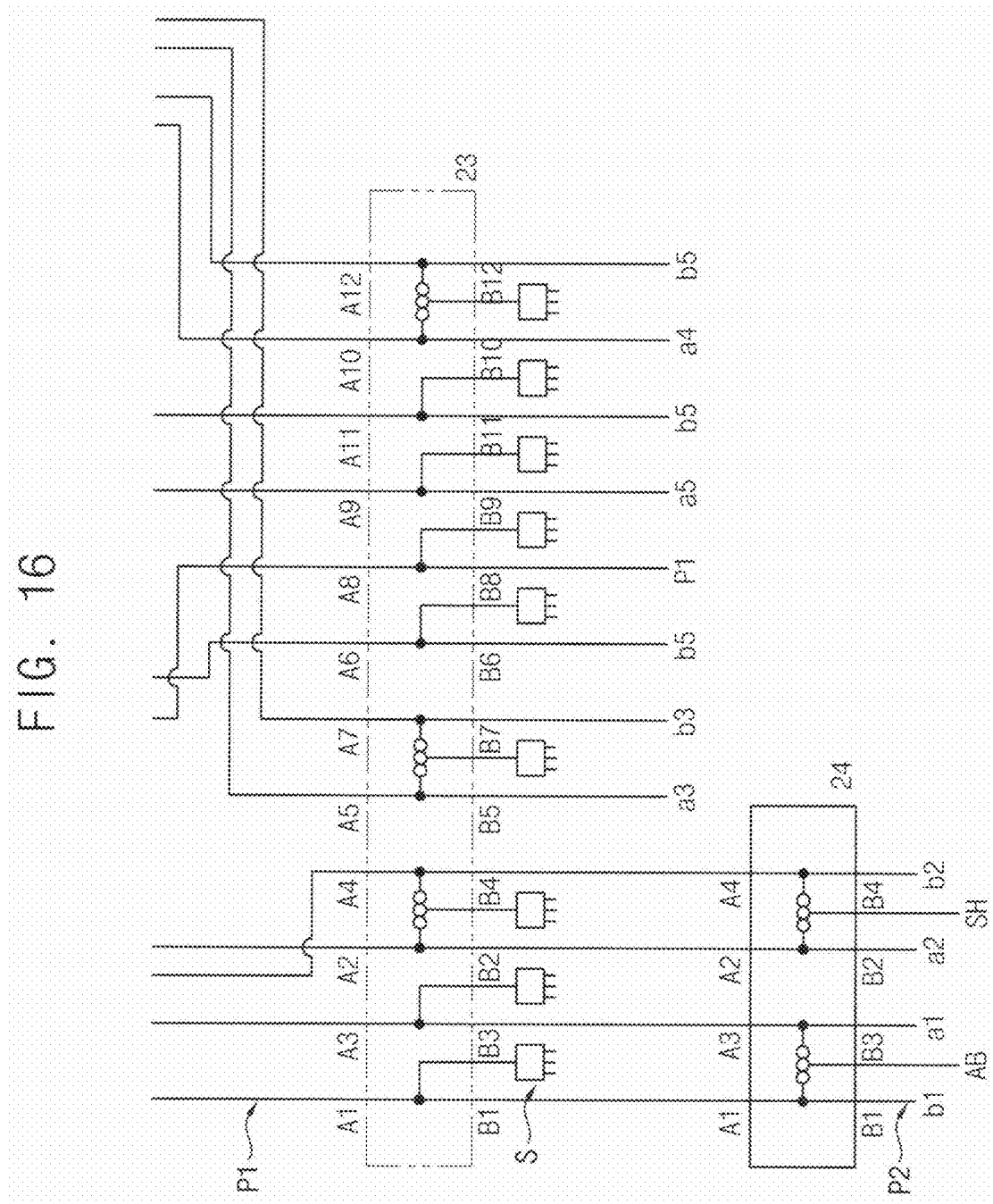

As illustrated in FIG. 16, if the user selects the button for View Circuit diagram, a circuit diagram showing the arm crowd pilot pressures and the pressure sensor may be provided during the arm crowd operation.

Although not illustrated in the drawings, if the user selects the button for View Performance standard value, a performance standard value graph or numerical value may be provided.

Figure 17:
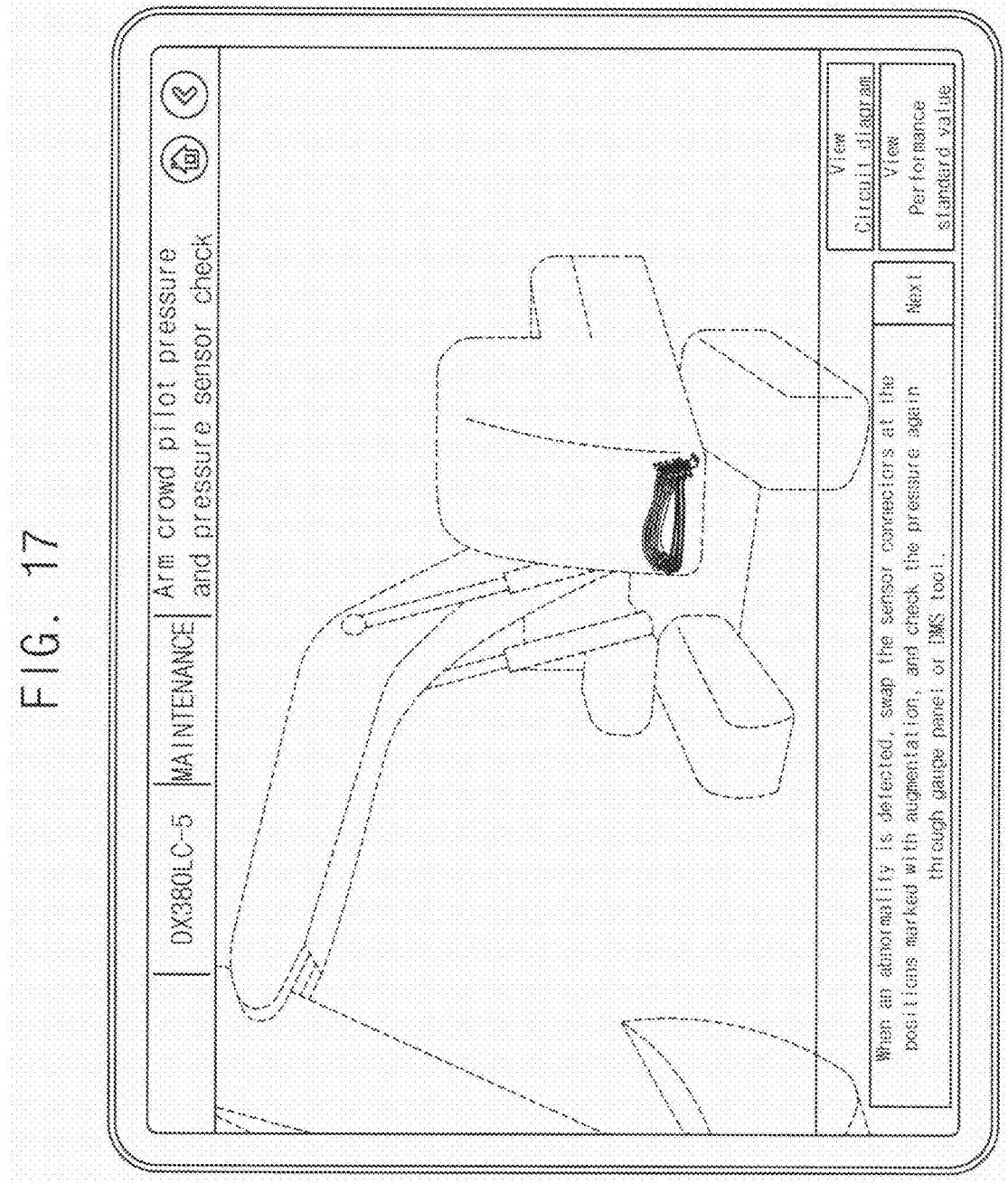
Figure 18:
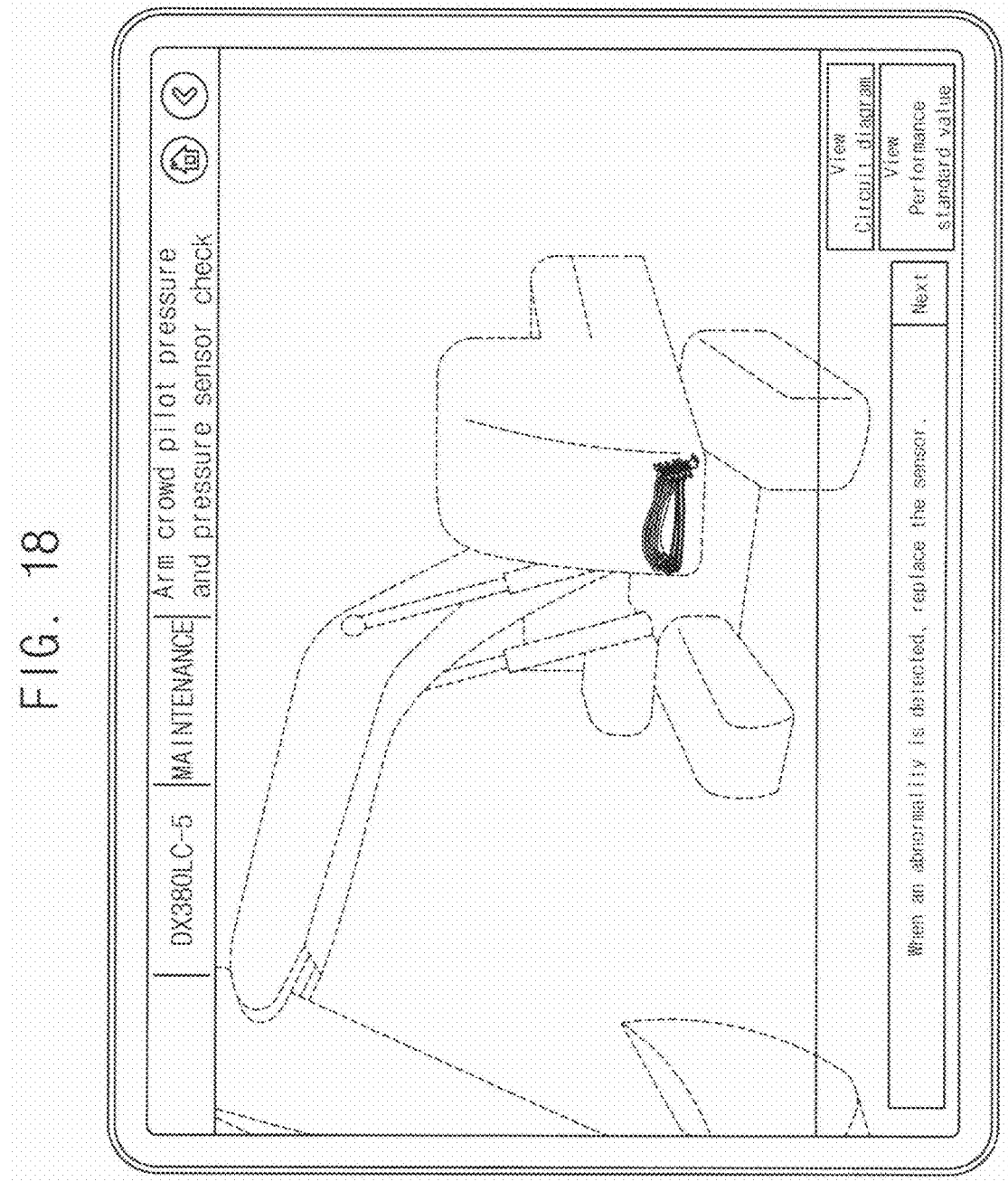

When the Next button is pressed on the screen of FIG. 14, a maintenance guide phrase may be provided at the bottom of the screen of FIG. 17, and when the Next button is pressed on the screen of FIG. 17, a maintenance guide phrase may be provided at the bottom of the screen of FIG. 18.

Accordingly, the user may check the hydraulic flow of a high pressure line, a pilot line and a return line connected to an actuator from a hydraulic pump through a main control valve in relation to the arm crowd issue through the augmented 3D model, to thereby easily check the arm circuit and recognize maintenance location.

Further, the user can check whether there are abnormalities simply by comparing them to the DMS monitor derived using the standard graph for the arm crowd performance, check the pilot pressure and the position of the arm crowd pilot sensor, and be provided with guidance on replacing the connector and the arm crowd pilot sensor.

If the same abnormal symptom occurs even after the measures according to the maintenance guide of the arm crowd operation, the user can request A/S.

As mentioned above, information on detailed performance items and methods for performance testing and maintenance may be provided easily and quickly and intuitively by utilizing augmented reality technology. Thus, it may be possible to improve the operator's diagnostic capability and self-maintenance capability, and to increase the operating time of equipment and reduce maintenance costs through rapid maintenance.

The present invention has been explained with reference to preferable embodiments, however, those skilled in the art may understand that the present invention may be modified or changed without being deviated from the concept and the scope of the present invention disclosed in the following claims.

THE DESCRIPTION OF THE REFERENCE NUMERALS

100: portable device
110: communication portion
120: input portion
130: camera portion
140: sensor portion
150: controller
160: storage portion
170: display portion

The invention claimed is:

1. A method of providing a maintenance manual for a construction machine, the method comprising:
    providing an augmented reality content selection menu for providing a maintenance manual for the construction machine;
    receiving a user's content selection signal;
    augmenting a virtual 3D model corresponding to the construction machine on a display portion in response to the content selection signal; and
    displaying augmented reality maintenance manual information at a corresponding position of the 3D model according to the content selection signal, wherein the displaying the augmented reality maintenance manual information includes:
    displaying a detailed part of the 3D model to be diagnosed according to the content selection signal; and
    displaying maintenance manual information related to the detailed part of the 3D model, and
wherein the displaying the detailed part of the 3D model includes:
    displaying an external shape of the 3D model to have a first transparency; and
    displaying a shape of the detailed part to have a second transparency lower than the first transparency.

2. The method of claim 1, wherein receiving the user's content selection signal includes
    receiving a performance test guide request signal or a maintenance guide request signal; and
    receiving a detailed item request signal.

3. The method of claim 1, wherein augmenting the 3D model on the display portion includes
    displaying an image collected through a camera portion as an image on the display portion;
    providing the 3D model on the image; and
    placing the 3D model at a position selected by the user.

4. The method of claim 3, wherein providing the 3D model includes superimposing an image of the ground close to the user or the construction machine collected through the camera portion and the 3D model.

5. The method of claim 3, wherein providing the 3D model includes
    providing an outline corresponding to an actual construction machine on the display portion; and
    augmenting the 3D model on an image of the actual construction machine when the image of the actual construction machine collected through the camera portion is matched with the outline.

6. The method of claim 1, wherein the maintenance manual information related to the detailed part of the 3D model includes animation information in which the 3D model moves.

7. The method of claim 1, wherein displaying the detailed part of the 3D model includes moving to an internal position of the 3D model in response to the user's input signal to provide a shape of the detailed part at the internal position.

8. The method of claim 1, wherein the augmented reality maintenance manual information includes guide information for performing a performance test or maintenance of the construction machine.

9. A portable device, comprising:
    a camera portion configured to collect images;
    a display portion configured to display the images collected through the camera portion; and
    a controller configured to augment a virtual 3D model corresponding to a construction machine on the display portion in response to an augmented reality content selection signal for providing a maintenance manual for the construction machine and configured to display augmented reality maintenance manual information at a corresponding position of the 3D model according to the augmented reality content selection signal,
    wherein the controller displays a detailed part of the 3D model to be diagnosed according to the content selection signal, and displays maintenance manual information related to the detailed part of the 3D model, and
    wherein the controller provides an external shape of the 3D model to have a first transparency and provides a shape of the detailed part to have a second transparency lower than the first transparency.

10. The portable device of claim 9, wherein the controller displays the image collected through the camera portion as an image on the display portion, provides the 3D model on the image, and places the 3D model at a position selected by a user.

11. The portable device of claim 10, wherein the controller superimposes an image of the ground close to the user or the construction machine collected through the camera portion and the 3D model.

12. The portable device of claim 10, wherein the controller provides an outline corresponding to an actual construction machine on the display portion, and augments the 3D model on an image of the actual construction machine when the image of the actual construction machine collected through the camera portion is matched with the outline.

13. The portable device of claim 9, wherein the maintenance manual information related to the detailed part of the 3D model includes animation information in which the 3D model moves.

14. The portable device of claim 9, wherein the controller moves to an internal position of the 3D model in response to a user's input signal to provide a shape of the detailed part at the internal position.

15. The portable device of claim 9, wherein the augmented reality maintenance manual information includes guide information for performing a performance test or maintenance of the construction machine.

* * * * *